United States Patent [19]

Jimbo et al.

[11] Patent Number: 5,571,879
[45] Date of Patent: Nov. 5, 1996

[54] METHOD OF VAPOR PHASE POLYMERIZATION OF OLEFINS

[75] Inventors: Makoto Jimbo; Mamoru Yoshikawa; Shinjiro Suga; Yoshihisa Yamaguchi, all of Kawasaki; Masahiro Niwa, Yokohama; Eiko Kobayashi, Yokosuka; Kunimichi Kubo, Tokyo, all of Japan

[73] Assignee: Nippon Petrochemicals Company, Limited, Tokyo, Japan

[21] Appl. No.: 595,520

[22] Filed: Feb. 1, 1996

Related U.S. Application Data

[63] Continuation of Ser. No. 174,277, Dec. 28, 1993, abandoned.

[30] Foreign Application Priority Data

Dec. 30, 1992 [JP] Japan .................... 4-360002
Dec. 30, 1992 [JP] Japan .................... 4-360003
Dec. 31, 1992 [JP] Japan .................... 4-361383

[51] Int. Cl.⁶ .................................................... C08F 2/34
[52] U.S. Cl. .............................. 526/74; 526/78; 526/79; 526/88; 526/116; 526/901
[58] Field of Search ........................ 526/74, 78, 79, 526/88, 116, 901

[56] References Cited

U.S. PATENT DOCUMENTS

| | | | |
|---|---|---|---|
| 3,708,465 | 1/1973 | Dietrich et al. | 260/93.7 |
| 3,971,768 | 7/1976 | Peters et al. | 526/68 |
| 4,006,101 | 2/1977 | Matsuura et al. | 252/429 C |
| 4,022,958 | 5/1977 | Matsuura et al. | 526/124 |
| 4,035,560 | 7/1977 | Caumartin et al. | 526/124 |
| 4,061,857 | 12/1977 | Kuroda et al. | 526/114 |
| 4,065,611 | 12/1977 | Miyoshi et al. | 526/124 |
| 4,083,802 | 4/1978 | Matsuura et al. | 252/429 C |
| 4,202,953 | 5/1980 | Matsuura et al. | 526/125 |
| 4,315,999 | 2/1982 | Matsuura et al. | 526/114 |
| 4,326,048 | 4/1982 | Stevens et al. | 526/68 |
| 4,396,534 | 8/1983 | Matsuura et al. | 252/429 B |
| 4,507,448 | 3/1985 | Kuroda et al. | 526/125 |
| 4,532,311 | 7/1985 | Fulks et al. | 526/62 |
| 4,855,370 | 8/1989 | Chirillo et al. | 526/74 |
| 5,034,479 | 7/1991 | Eisinger et al. | 526/68 |
| 5,077,358 | 12/1991 | Durand et al. | 526/125 |

FOREIGN PATENT DOCUMENTS

| | | |
|---|---|---|
| 0099660A1 | 2/1984 | European Pat. Off. . |
| 0136029A2 | 4/1985 | European Pat. Off. . |
| 0313087A1 | 4/1989 | European Pat. Off. . |
| 0315192A1 | 5/1989 | European Pat. Off. . |
| 0366823A1 | 5/1990 | European Pat. Off. . |
| 0407143A2 | 1/1991 | European Pat. Off. . |
| 0413469A2 | 2/1991 | European Pat. Off. . |
| 0428375A2 | 5/1991 | European Pat. Off. . |
| 0471497A1 | 2/1992 | European Pat. Off. . |
| 0493118A2 | 7/1992 | European Pat. Off. . |
| 0500392A2 | 8/1992 | European Pat. Off. . |
| 0507574A2 | 10/1992 | European Pat. Off. . |
| 0534405A1 | 3/1993 | European Pat. Off. . |
| 2075128 | 10/1971 | France . |
| 2312512 | 12/1976 | France . |
| 1248951 | 10/1971 | United Kingdom . |
| 1248953 | 10/1971 | United Kingdom . |
| 1248952 | 10/1971 | United Kingdom . |
| 2099004A | 12/1982 | United Kingdom . |
| WO86/07065 | 12/1986 | WIPO . |

Primary Examiner—David W. Wu
Attorney, Agent, or Firm—Fisher, Christen & Sabol

[57] ABSTRACT

In the polymerization of olefins with a vapor phase fluidized bed reactor, the improvement comprises the steps of feeding seed polymer particles and the reaction is then started after feeding an organoaluminum compound on a prescribed basis, thereby avoiding the formation of sheet-like polymer in the initial period of the reaction and the lowering of the bulk density of the product polymer.

16 Claims, No Drawings

METHOD OF VAPOR PHASE POLYMERIZATION OF OLEFINS

This application is a continuation of prior U.S. application Ser. No. 08/174,277 filing date 12/28/93, now abandoned.

BACKGROUND OF THE INVENTION (1) Field of the invention

This invention relates to a method of operation for vapor phase polymerization of olefins. More particularly, the invention relates to a method for starting the operation so as to reduce the formation of sheet-like polymer in the initial stage of the process of polymerization or copolymerization of α-olefins in a vapor phase fluidized bed.

(2) Description of Prior Art

When the polymerization of a-olefins is carried out in a vapor phase fluidized bed, the formation of sheet-like polymer is liable to occur in the initial stage of the polymerization and the sheet-like polymer blocks up the outlet for polymer product and other parts such as pipings in the downstream side. The blocking sometimes makes the operation substantially impossible to be continued.

The formation of sheet-like polymer is liable to occur during the period from the feeding of a catalyst into a reactor before the polymerization to the stage in which a certain quantity of polymer is produced. In other words, the sheet-like polymer is seldom formed in the regular reaction stage after the passage of the initial stage.

Accordingly, it is considered that the formation of sheet-like polymer is caused by the differences in some conditions in the period between the initial starting stage from the conditions in the regular reaction state of the polymerization system.

In the initial stage of polymerization, it is liable to occur that the sheet-like polymer is formed as well as that the bulk density of the polymer obtained in the initial stage is lower than that of the product obtained in the stable regular operation.

In the polymerization using a vapor phase fluidized bed, one of the factors to have influences on productivity is the bulk density of polymer produced. Because the productivity is determined by the weight of polymer produced per unit time with a certain volume of a reactor, when the bulk density of the polymer is increased, the productivity can be improved. Accordingly, it is desirable to maintain constantly a higher bulk density from the initial stage to and through the regular or steady state period of the polymerization.

Furthermore, polymer products are taken out from a reactor intermittently and the volume of polymer to be taken out during each time is predetermined. In the case that the bulk density of a polymer is low, the quantity of polymer particles in the discharged gases is small, so that the volume of the entrained gases discharged together with the polymer of a certain quantity is increased. The entrained gases consist of unreacted gases including nitrogen and ethylene. It is not advantageous in view of economy to recover the ethylene by separating it from the unreacted gases. Therefore, if it is possible to make the bulk density of polymer product in the initial stage as large as the value of the normal product obtained in the regular operation period, the quantity of the above-mentioned entrained unreacted gases can be reduced and the process can be improved in view of economy and production efficiency.

As described above, the productivity and economy can be improved by avoiding the lowering of the bulk density of polymer produced in the initial stage of polymerization.

Furthermore, even when hydrogen gas is fed in a predetermined gas ratio in the initial stage of polymerization, the melt flow rate (MFR) of polymer is often different from the MFR value of the polymer obtained in the regular operation period. In other words, it is observed that the function of hydrogen to control the molecular weight is not normal.

When such a phenomenon is caused to occur, trial and error operation must be repeated by changing the gas composition, measuring the changed values in MFR of obtained polymers and feeding a resultant value back to the gas composition. In the vapor phase fluidized bed operation, however, it takes many hours to replace all the polymer with a new polymer in a reactor because the residence time of the polymer particles is generally as long as several hours.

Accordingly, if the value of MFR can be maintained at a normal value from the initial stage of polymerization, the regular state production can be started producing neither wide specification product nor second-grade product.

It is disclosed in U.S. Pat. No. 5,077,358 that the seed polymer is treated with an organoaluminum compound prior to the polymerization of olefins in order to cause the compound to react with wager contained in the seed polymer (ibid., column 8, lines 32–39). In this patent, it is proposed that the seed polymer is placed in a low moisture condition, for example, by bringing it to contact with nitrogen before the treatment of the seed polymer with the organoaluminum compound. The reason for this is such that, when the seed polymer is brought into contact with an environment of a high moisture content and the seed polymer is then treated with the organoaluminum compound, the agglomeration of seed polymer is caused to occur (ibid., column 8, lines 45–54). In other words, according to this patent, the object to treat the seed polymer with an organoaluminum compound is to avoid the formation of agglomerates in a polymerization process. It is also described that the agglomerated lumps of polymer in polymerization is formed by the agglomeration of seed polymer particles.

In addition to the agglomerated lumps formed in polymerization due to the agglomeration of seed polymer, it is considered that the agglomerated lumps of polymer including those of prepolymer are formed also by the agglomeration of solid catalyst component that is fed into the reaction system, the formation of which is not restricted to the initial period of polymerization.

The sheet-like polymer referred to in the present invention is generated such that the polyolefin is adhered to the inner wall of the polymerization reactor and fused to form a polyolefin sheet and it is peeled off from the wall surface, which is literally in the form of a sheet. Even though the reason is not yet obvious, the formation of sheet is liable to occur in the initial period of polymerization. On the other hand, it is observed that the sheet-like polymer is hardly formed in the stable or steady-state operation period (regular operation).

Although the cause of the formation of polymer sheet has never been sufficiently elucidated, the mechanism of the sheet formation is hypothesized by the present inventors as follows:

When the polymerization is made to proceed, a part of the catalyst adheres on the inside wall surface of the reactor. Because the portion near the adhered catalyst hardly becomes turbulent, the generated heat of polymerization is accumulated there and formed polymer is melted to form the sheet. When the formed sheet grows to have a certain thickness, it is released from the inside wall surface of a reactor and it is mingled into the reaction system, which causes the disarrangement of the fluidized state and the blocking of pipings. The catalyst referred to above includes not only the solid catalyst component but also polyolefin particles having polymerization activity.

Because the formation of sheet-like polymer is observed in the initial period of polymerization, the tendency for the adhesion of catalyst to the inside wall of the polymerization reactor, in other words, the likelihood of the catalyst to adhere, depends upon the conditions in the reaction system in the initial period of polymerization including the pretreatment of the reaction system and it is not influenced by the conditions of polymerization after that.

The important point to avoid the formation of sheet-like polymer is not the seed polymer or produced polyolefin particles themselves but the catalyst which is adhered to the inside wall of polymerization reactor. Supposing that seed polymer particles or formed polyolefin particles (having no polymerization activity) are adhered to the inside wall, if no catalyst is adhered, there occurs neither polymerization reaction nor the generation of heat of polymerization. The sheet of fused polymer is formed by the accumulation of the heat of polymerization, if the thickness of adhered catalyst or a mixture of catalyst and polymer particles is relatively small, the heat is diffused without difficulty and the sheet-like polymer is not formed. Therefore, the sheet-like polymer is formed only when the thickness of the adhered catalyst is larger than a certain value.

In other words, it is believed that the formation of sheet-like polymer largely relates to the adhesion of catalyst to the inside wall of the polymerization reactor and the degree of such adhesion. The force to adhere the catalyst is produced by Coulomb forces of static electricity in the electrically charged catalyst component and polymer particles. Accordingly, the condition of the adhesion relates to the charged state of the solid catalyst component and polymer particles in the reaction system.

The inventors have found out that the condition of the adhesion of catalyst to the inside wall of a polymerization reactor can be controlled by treating not only the seed polymer but also the whole reaction system with an organoaluminum compound. In practice, the treatment is done after the first feeding of seed polymer particles into a reactor but prior to the start of polymerization. In other words, the tendency of catalyst to adhere to the reactor wall can be regulated by this treatment.

The organoaluminum compound reacts with water and many other impurities and loses its function. The impurities exist not only in the mass of seed polymer but also in the dead spaces in the reaction system such as the portions near the inside walls of the reactor and the pipings. Furthermore, the impurities exist on and near the inside walls of the reactor and pipings in a chemically or physically adsorbed state. Therefore, the removal of impurities is quite difficult. For example, the removal of impurities is difficult by the so-called purging with an inert gas, olefin gas, hydrogen, or a mixture of them. Even when the removal of impurities is possible, the time length necessary for the purging is very long, so that such a measure cannot be adopted in practical working. What is worse, because the impurities are not always volatile, it is not possible to remove all impurities by the purging.

When the quantity of organoaluminum compound used is large to excess in the above treatment, the ratio of low molecular weight polymer increases in the product of the initial period of polymerization, which undesirably raises the value of MFR of the obtained polymer. In this case, until the excess organoaluminum compound is completely consumed after the start of polymerization, the polyolefin having a higher MFR value is produced, which is uneconomical. In the use for film formation, such a product is not only uneconomical but also undesirable because the polyolefin used for producing films desirably contains a small quantity of lower molecular weight polymer in order to avoid blocking of prepared films.

However, because the kinds and quantities of impurities in a reaction system to consume the organoaluminum compound cannot be measured beforehand, it is necessary to estimate the quantity of the organoaluminum compound required for treating the reaction system by some measures.

Incidentally, in the foregoing U.S. Pat. No. 5,077,358, it is described that, when excess organoaluminum compound is used to treat seed polymer, hot spots are brought forth by the increased polymerization activity and agglomerates of polymer particles are liable to occur (ibid., column 9, line 63 to page 10, line 3). When the seed polymer is not treated with an organoaluminum compound, the agglomerates of polymer particles are also caused to occur. Accordingly, when the quantity of organoaluminum compound is more than a certain amount or less than a certain amount, the formation of agglomerates of organoaluminum compound may be caused to occur in both of the cases.

However, in accordance with the experiments carried out by the present inventors, the formation of sheet-like polymer is not influenced substantially by the excess feed of organoaluminum compound and the excess feed of the organoaluminum compound is rather preferable for the purpose of avoiding the formation of sheet-like polymer. It is understood, however, that a polymer having a high MFR value is produced as described in the foregoing passage. Accordingly, it is considered that the cause and conditions for of the formation of sheet-like polymer referred to in the present invention is different from those for the formation of the agglomerates described in the above-mentioned U.S. Patent.

BRIEF SUMMARY OF THE INVENTION

The object of the present invention is, therefore, to provide an operating method for polymerizing olefins while solving the problem relating to the formation of sheet-like polymer and the lowering of bulk density of polymer in the initial stage of polymerization by using a vapor phase fluidized bed reactor.

In view of the above object, the present inventors have carried out extensive investigations. They have observed the state of adhesion of catalyst on the inside wall of a polymerization reactor and related electrically charged conditions from the step of feeding an organoaluminum compound, through the starting of polymerization, to the stable regular polymerization step. As a result, it was found out that specific phenomena are caused to occur in the step of feeding the organoaluminum compound and the present invention has been accomplished in view of the finding that the feeding of organoaluminum compound can be determined on the basis of the above observation.

The present invention relates to a method of vapor phase polymerization of olefins. That is, in the method to start the stationary operation of vapor phase polymerization or copolymerization of olefins by feeding a catalyst comprising a solid catalyst component of one or both of titanium and vanadium, and magnesium, and an organoaluminum compound into a reactor, the improvement comprising the steps of:

(I) feeding in the first place seed polymer particles into the reactor;

(II) feeding then an organoaluminum compound into the reactor until the state of the reactor meets at least one of the following conditions:
  (a) the difference ($\delta T$) of an indicated value of a short thermometer and that of a long thermometer is abruptly decreased, said thermometers being inserted into said reactor;
  (b) the electrostatic voltage in the reactor is changed from a minus value to zero; and
  (c) the center of oscillation of electrostatic current in the reactor is changed to zero and the value of amplitude is minimum;

(III) feeding an additional quantity of organoaluminum compound into the reactor, the quantity being calculated with the following equation (I):

$$A = 0.044 \times V^{2/3} + aW \qquad (I)$$

wherein A is the quantity (mol) of the feed of organoaluminum compound, V is the volume (m$^3$) of the whole reaction system including gas circulation pipings, W is the weight (ton) of seed polymer; and a is a coefficient (mol/ton) in the range from 0 to 89; and (IV) starting the reaction with further feeding solid catalyst component and organoaluminum compound.

DETAILED DESCRIPTION OF THE INVENTION

The present invention will be described in more detail in the following.

The reactor used for the polymerization or copolymerization of olefins under a vapor phase condition substantially includes all of those used for the operation in a vapor phase fluidized bed system or stirred bed system in a gas-solid system, in which the use of a stirrer is optional.

The olefins used in the present invention have 2 to 8 carbon atoms, preferably 2 to 6 carbon atoms. For example, α-olefins such as ethylene, propylene, butene-1, pentene-1, hexene-1, and 4-methylpentene-1 are used. These olefins can be used singly for homopolymerization or for copolymerization of two or more kinds of them. The combinations of monomers for copolymerization are exemplified by those of ethylene and an α-olefin having 3 to 12 carbon atoms such as ethylene/propylene, ethylene/butene-1, ethylene/hexene-1, and ethylene/4-methylpentene-1; propylene/butene-1; and the combination of ethylene and two kinds or more of α-olefins.

Furthermore, it is possible to copolymerize with dienes for the purpose of improving the properties of the polyolefin. Exemplified as the dienes are butadiene, 1,4-hexadiene, ethylidenenorbornene, and dicyclopentadiene.

The feeding of olefins into the reaction system is preferably carried out together with a suitable inert carrier gas such as nitrogen.

The catalysts used for the above polymerization of olefins are composed of an organoaluminum compound and a solid catalyst component which contains at least one or both of titanium and vanadium, and magnesium. The solid catalyst component containing at least one or both of titanium and vanadium, and magnesium is exemplified by a catalyst component containing titanium and magnesium which is well known as a Ziegler type catalyst for the polymerization of olefins, a catalyst component containing vanadium and magnesium, and a catalyst component containing titanium, vanadium and magnesium.

More particularly, the above catalyst components are prepared by adding a titanium compound and/or vanadium compound on a carrier of magnesium-containing inorganic solid compounds such as metallic magnesium, magnesium hydroxide, magnesium carbonate, magnesium oxide, and magnesium chloride, or double salts, double oxides, carbonates, chlorides and hydroxides containing magnesium and an element selected from silicon, aluminum, and calcium, or those obtained by treating or reacting the above inorganic solid compounds with an oxygen-containing compound, sulfur-containing compound, aromatic hydrocarbon or halogen-containing compound.

The above-mentioned oxygen-containing compounds are exemplified by water; polysiloxane; organic oxygen-containing compounds such as alcohols, phenols, ketones, aldehydes, carboxylic acids, esters, and acid amides; alkoxides of metals; and inorganic oxygen-containing compounds such as oxychlorides of metals. The sulfur containing compounds are exemplified by organic sulfur-containing compounds such as thiols and thioethers and inorganic sulfur-containing compounds such as sulfur dioxide, sulfur trioxide, and sulfuric acid. The aromatic hydrocarbons are exemplified by monocyclic or polycyclic aromatic hydrocarbons such as benzene, toluene, xylene, anthracene, and phenanthrene. The halogen-containing compounds are exemplified by chlorine, hydrogen chloride, metal chlorides, and organic halides.

The foregoing titanium compounds are exemplified by halides, alkoxy halides, alkoxides, and oxychlorides of titanium. Among them, tetra-valent titanium compounds and tri-valent titanium compounds are preferably used. The tetra-valent titanium compounds are represented by the general formula:

$$Ti(OR)_n X_{4-n}$$

in which R is a hydrocarbon radical such as an alkyl group, aryl group or aralkyl group having 1 to 20 carbon atoms, X is a halogen atom and n is a numeral of $0 \leq n \leq 4$.

More particularly, the titanium compounds are exemplified by titanium tetrachloride, titanium tetrabromide, titanium tetraiodide, trichlorotitanium monomethoxide, dichlorotitanium dimethoxide, monochlorotitanium trimethoxide, titanium tetramethoxide, trichlorotitanium monoethoxide, dichlorotitanium diethoxide, monochlorotitanium triethoxide, titanium tetraethoxide, trichlorotitanium monoisopropoxide, dichlorotitanium diisopropoxide, monochlorotitanium triisopropoxide, titanium tetraisopropoxide, trichlorotitanium monobutoxide, dichlorotitanium dibutoxide, monochlorotitanium tributoxide, titanium tetrabutoxide, trichlorotitanium monopentoxide, trichlorotitanium monophenoxide, dichlorotitanium diphenoxide, monochlorotitanium triphenoxide, and titanium tetraphenoxide.

The tri-valent titanium compounds are represented by the general formula:

$$Ti(OR)_m X_{4-m}$$

in which R is a hydrocarbon radical such as an alkyl group, aryl group or aralkyl group having 1 to 20 carbon atoms, X is a halogen atom and m is a numeral of 0<m<4. These compounds are exemplified by tri-valent titanium compounds which are prepared by reducing halogenated titanium alkoxides with hydrogen, aluminum, titanium or organometallic compounds of the group I to III of the periodic table.

Among the above titanium compounds, the tetravalent titanium compounds are preferable.

More particularly, the catalysts are exemplified by those prepared by combining organoaluminum compounds with solid catalyst components of:

MgO-RX-TiCl$_4$ (U.S. Pat. No. 4,065,611),

Mg-SiCl$_4$-ROH-TiCl$_4$,

MgCl$_2$-Al(OR)$_3$-TiCl$_4$ (U.S. Pat. No. 4,202,953),

MgCl$_2$-SiCl$_4$-ROH-TiCl$_4$ (U.S. Pat. Nos. 4,006,101 and 4,083,802),

Mg(OOCR)$_2$-Al(OR)$_3$-TiCl$_4$ (U.S. Pat. No. 4,022,958),

Mg-POCl$_3$-TiCl$_4$,

MgCl$_2$-AlOCl-TiCl$_4$ (U.S. Pat. No. 4,061,857),

MgCl$_2$-Al(OR)$_n$X$_{3-n}$-Si(OR')$_m$X$_{4-m}$-TiCl$_4$ (U.S. Pat. No. 4,507,448)

in which R and R' are organic residual groups and X is a halogen atom.

The foregoing vanadium compounds are exemplified by tetra-valent vanadium compounds such as vanadium tetrachloride, vanadium tetrabromide, and vanadium tetraiodide; and penta-valent vanadium compounds such as vanadium oxytrichloride and orthoalkyl vanadate; and tri-valent vanadium compounds such as vanadium trichloride and vanadium triethoxide.

The vanadium compounds can be used singly or in combination with the titanium compounds.

Exemplified as other catalysts are the combination of organoaluminum compounds with a solid catalyst component prepared by reacting an organomagnesium compound of the so-called Grignard reagent with a titanium compound and/or a vanadium compound. The organomagnesium compounds are exemplified by the compounds represented by the general formulae: RMgX, R$_2$Mg and RMg(OR), in which R is an organic radical having 1 to 20 carbon atoms and X is a halogen atom, and their ether complexes, and other compounds which are prepared by modifying the above organomagnesium compounds with other organometallic compounds such as organosodium, organolithium, organopotassium, organoboron and organocalcium.

Typical examples of the above catalysts are the compounds prepared by combining an organoaluminum compound with a solid catalyst component such as RMgX-TiCl$_4$ type, RMgX-phenol-TiCl$_4$ type, RMgX-halogenated phenol-TiCl$_4$ type and RMgX-CO$_2$-TiCl$_4$ type.

Other catalyst systems are exemplified by the combination of an organoaluminum compound with a solid substance which is obtained by reacting an inorganic oxide as a solid catalyst component such as SiO$_2$, Al$_2$O$_3$ and SiO$_2$.Al$_2$O$_3$ with the above-described solid catalyst component containing magnesium and titanium and/or vanadium. Besides the above inorganic oxides of SiO$_2$, Al$_2$O$_3$ and SiO$_2$.Al$_2$O$_3$; CaO, Ba$_2$O$_3$ and SnO$_2$ are also used. Furthermore, the double oxides of the above oxides can also be used. These inorganic oxides are brought into contact with the solid catalyst component containing magnesium and titanium and/or vanadium through a well-known method. More particularly, the reaction is carried out at a temperature in the range of 20° to 400° C., preferably 50° to 300° C., generally for 5 minutes to 20 hours with or without an organic solvent such as an inert hydrocarbon, alcohol, phenol, ether, ketone, ester, amine, nitrile or a mixture of them. The reaction may be carried out by any suitable method such as performing ball milling of all component materials.

Practical examples of the above catalyst systems are the combination of an organoaluminum compound with solid catalyst component exemplified as follows:

SiO$_2$-ROH-MgCl$_2$-TiCl$_4$ (U.S. Pat. No. 4,315,999),

SiO$_2$-ROR'-MgO-AlCl$_3$-TiCl$_4$ (British Patent No. 2,099,004),

SiO$_2$-MgCl$_2$-Al(OR)$_3$-TiCl$_4$-Si(OR')$_4$ (U.S. Pat. No. 4,396,534),

SiO$_2$-TiCl$_4$-R$_n$AlCl$_{3-n}$-MgCl$_2$-Al(OR')$_n$Cl$_{3-n}$ (EP-A No. 407143),

SiO$_2$-TiCl$_4$-R$_n$AlX$_{3-n}$-MgCl$_2$-Al(OR')$_n$Cl$_{3-n}$-Si(OR")$_n$Cl$_{4-n}$ (EP-A No. 413469),

SiO$_2$-MgCl$_2$-Al(OR')$_n$Cl$_{3-n}$-Ti(OR")$_4$-R$_n$AlCl$_{3-n}$ (EP-A No. 428375)

SiO$_2$-MgCl$_2$-Al(OR')$_n$Cl$_{3-n}$-Ti(OR")$_n$Cl$_{4-n}$-R$_n$AlCl$_{3-n}$ (EP-A No. 428375)

SiO$_2$-TiCl$_4$-R$_n$AlCl$_{3-n}$-MgCl$_2$-Al(OR')$_n$Cl$_{3-n}$-R'''$_m$Si(OR''')$_n$X$_{4-(m+n)}$ (EP-A No. 493118)

SiO$_2$-R$_n$MgX$_{2-n}$-Al(OR')$_n$Cl$_{3-n}$-Ti(OR")$_n$Cl$_{4-n}$-R'''OH-R$_n$AlX$_{3-n}$ (EP-A No. 507574)

SiO$_2$-MgCl$_2$-Al(OR')$_n$Cl$_{3-n}$-Ti(OR")$_n$Cl$_{4-n}$-R'''OH-R$_n$AlCl$_{3-n}$-Al(OR')$_n$Cl$_{3-n}$ (EP-A No. 500392)

in which R, R', R" and R''' are hydrocarbon residual groups, respectively.

In these catalyst systems, the compounds of titanium and/or vanadium can be used as the adducts of organic carboxylic esters. Furthermore, it is possible to use the foregoing inorganic solid compounds after bringing the compounds into contact with organic carboxylic acid esters. Still further, the organoaluminum compounds can be used as an adduct with an organic carboxylic acid ester. In other words, the catalyst systems which are prepared in the presence of organic carboxylic acid esters can be used.

The organic carboxylic acid esters used herein are exemplified by the esters of aliphatic, alicyclic and aromatic carboxylic acids. Among all, aromatic carboxylic acid esters having 7 to 12 carbon atoms are preferable, which are exemplified by alkyl esters such as methyl ester and ethyl ester of benzoic acid, anisic acid, and toluic acid.

The organoaluminum compounds used together with the above-described solid catalyst components are those having at least one of aluminum-carbon bond in the molecule.

For example, they are exemplified by:

(i) organoaluminum compounds represented by the general formula:

$$R_mAl(OR')_nH_pX_q$$

in which each of R and R' is a hydrocarbon group having 1 to 15 carbon atoms, preferably 1 to 4 carbon atoms such as alkyl, aryl, alkenyl, or cycloalkyl group. The alkyl groups are exemplified by methyl, ethyl, propyl, isopropyl, isobutyl, sec-butyl, tert-butyl, hexyl and octyl groups. R and R' may be either the same or different ones. X is a halogen atom. The symbols m, n, p and q are, respectively, 0<m≦3, 0≦n<3, 0≦p<3, and 0≦q<3 as well as (m+n+p+q)=3, and (ii) alkylated complexes of a metal of the group I of the periodic table with aluminum which is represented by the general formula:

$$MAlR_4$$

in which M is a metal selected from the group of Li, Na and K, and R is the same hydrocarbon group as the above.

Exemplified as the organoaluminum compounds belonging to the above (i) are:

General formula: $R_mAl(OR')_{3-m}$ in which each of R and R' is the same hydrocarbon group as the above one and m is a numeral preferably in the range of $1.5 \leq m \leq 3$.

General formula: $R_mAlX_{3-m}$ in which R is the same hydrocarbon group as the above one, X is a halogen atom and m is a numeral preferably in the range of $0<m<3$.

General formula: $R_mAlH_{3-m}$ in which R is the same hydrocarbon group as the above one and m is a numeral preferably in the range of $2 \leq m < 3$.

General formula: $R_mAl(OR')_nX_q$ in which R is the same hydrocarbon group as the above one, X is a halogen atom, and each of m, n and q is a numeral preferably in the ranges of $0<m\leq3$, $0\leq n<3$, and $0\leq q<3$ and $(m+n+q)=3$.

The organoaluminum compounds belonging to the group (i) are exemplified by trialkylaluminums such as trimethylaluminum, triethylaluminum, triisopropylaluminum, triisobutylaluminum, tri-sec-butylaluminum, tri-tert-butyl aluminum, trihexylaluminum and trioctylaluminum; trialkenylaluminum; dialkylaluminum alkoxides such as diethylaluminum ethoxide and dibutylaluminum butoxide; alkylaluminum sesquialkoxide such as ethylaluminum sesquiethoxide and butylaluminum sesquibutoxide as well as partially alkoxylated alkylaluminum represented by the average composition of $R_{2.5}Al(OR)_{0.5}$; dialkylaluminum halides such as diethylaluminum chloride, dibutylaluminum chloride, and diethylaluminum bromide; partially halogenated alkylaluminums such as ethylaluminum sesquichloride, butylaluminum sesquichloride, ethylaluminum sesquibromide; partially hydrogenated alkylaluminums such as dialkylaluminum hydrides of diethylaluminum hydride and dibutylaluminum hydride and alkylaluminum dihydrides such as ethylaluminum dihydride and propylaluminum dihydride; and partially alkoxylated or halogenated alkylaluminums such as ethylaluminum ethoxychloride, butylaluminum butoxychloride, and ethylaluminum ethoxybromide.

The organoaluminum compounds belonging to the above group (ii) are exemplified by $LiAl(C_2H_5)_4$ and $LiAl(C_7H_{15})_4$.

As the above organoaluminum compounds belonging to the above (i), it is possible to use the compounds in which two or more aluminum atoms are bonded through oxygen atoms or nitrogen atoms can also be used, which compounds are exemplified by $(C_2H_5)_2AlOAl(C_2H_5)_2$, $(C_4H_9)_2AlOAl(C_4H_9)_2$, and $(C_2H_5)_2AlN(C_2H_5)Al(C_2H_5)_2$.

Among the above-mentioned compounds, trialkylaluminums are most preferable.

The quantity of organoaluminum compound to be used in regular operation is not limited, however, it may be in the range from 0.05 to 1000 moles per 1 mole of titanium compound.

The polymerization according to the present invention is carried out in the like manner as the ordinary polymerization of olefins in the presence of a Ziegler type catalyst. That is, the reaction is substantially carried out under a vapor phase condition. Concerning other polymerization conditions, the temperature is in the range of 10° to 200° C., preferably 40° to 150° C. and the pressure is in the range from the normal pressure to 70 kg/cm²·G, preferably 2 to 60 kg/cm²·G.

The regulation of molecular weight can be attained effectively by adding hydrogen into a polymerization system although it can be done to some extent by changing the polymerization conditions such as temperature, molar ratios of catalysts or the like. During the regular or steady-state operation, the regulation of molecular weight is usually carried out by controlling the hydrogen/olefin molar ratio.

Olefins, solid catalyst component and organoaluminum compound are introduced constantly into the reaction system during the regular operation, meanwhile the produced polymer particles are taken out from the polymerization system.

In the polymerization of olefins in a fluidized bed reactor, the reactor is previously fed with the so-called seed polymer of resin particles to start fluidization, and the polymerization is then started by continuously feeding the reactor with mixed gases as starting materials, a solid catalyst component and an organoaluminum compound as a co-catalyst. Because the catalyst is hardly dispersed, in the case that the seed polymer is not used, granular resin cannot be formed and the fluidized bed cannot be formed either. Accordingly, when the fluidized bed polymerization reactor is used, the seed polymer is inevitably fed into the reactor in the initial stage of polymerization.

Incidentally, the seed polymer used in the present invention which is fed into the reactor prior to the start of polymerization, is not especially limited as far as it can form a fluidized bed or a stirred bed. However, the polyolefin particles, especially those having the same properties as those of product to be prepared, is generally preferable as the seed polymer.

The seed polymer used in the present invention has preferably an average particle diameter of 500 to 1500 μm and a bulk density of 0.25 to 0.5 g/cm³. It is preferable that the amount of particles of smaller than 300 μm in particle size in the seed polymer particles is small.

The quantity of the seed polymer is not especially limited as far as it can form a fluidized bed or stirred bed.

In the initial stage of polymerization, the lowering of bulk density of produced polymer is caused to occur besides the formation of sheet-like polymer.

It was found out that the formation of sheet-like polymer in the period after the start of feeding of catalyst and before the regular polymerization stage, can be avoided by treating the whole reaction system with organoaluminum compound prior to the start of polymerization.

However, it is difficult to determine previously the quantity of the organoaluminum compound to be fed to the whole reaction system. The cause of the above fact may depends upon the following three reasons:

(1) When a reaction system is opened or cleaned, impurities remain in the dead space of the system. The remaining impurities are continuously released to consume the organoaluminum compound and to lower its effective concentration.

(2) The impurities contained in the seed polymer which is fed from the outside of a reactor, are released in the reaction system to consume the organoaluminum compound and to lower the effective concentration.

(3) The seed polymer which is previously fed from the outside adsorbs the organoaluminum compound to lower the effective concentration.

When the reaction is started by feeding a solid catalyst component into the reaction system, there are assumed three kinds of cases with regard to the quantities of effective organoaluminum compound as a co-catalyst contained in the whole reaction system, relative to the solid catalyst component.

The first case is such that an organoaluminum compound of a certain quantity is fed but it is insufficient for carrying out the polymerization. In this case, the solid catalyst component as fed does not cause the reaction to occur unless it comes into contact with separately introduced organoaluminum compound that is fed in order to start the reaction. Therefore, the solid catalyst component is liable to be accumulated in the portions near the inside wall of the reactor. Accordingly, when said solid catalyst component comes into contact with the separately fed organoaluminum compound after that, the polymerization is started mainly in the portions near the inside wall of the reactor. The possibility that the polymerization of this kind causes the formation of the sheet-like polymer near the reactor wall, is high. In this case, the lowering of bulk density and MFR value of polymer are also observed.

In the second case, a certain quantity of organoaluminum compound exists but it is insufficient for the quantity of the solid catalyst component, in which the activity of polymerization is quite unstable. In other words, the polymerization activity is largely varied by a slight change in the quantity of the organoaluminum compound. In addition, the polymerization is started just after the feeding of solid catalyst component, however, the bulk density of polymer is lowered, the reaction becomes unstable, MFR is also lowered, and the formation of sheet-like polymer is often caused to occur.

Lastly, when the quantity of organoaluminum compound is large, the polymerization is started just after the feeding of the catalyst. Even though the activity of polymerization is lower than that of regular operation state, the degrees of the lowering of bulk density is small and the formation of sheet-like polymer does not occur. In this case, however, the ratio of low molecular weight polymer in the produced polymer increases and the MFR value of the product also increases. Especially, when the content of low molecular weight polymer is high in the polyolefin for use in making films, it is not desirable because the blocking of produced film is liable to occur.

Accordingly, when a proper quantity of effective organoaluminum compound as a co-catalyst exists relative to the quantity of solid catalyst component in a reactor at the time to start the feeding of catalyst, the formation of sheet-like polymer can be suppressed. In addition, other unusual phenomena in the initial stage of reaction can also be avoided.

As described above, when the polymerization is started, the quantity of the organoaluminum compound to be fed after the feeding of seed polymer is largely dependent upon the conditions of the whole reaction system such as the quantities of the impurities which exist in the reactor and pipings before the feeding of seed polymer and the impurities contained in seed polymer particles themselves and the feed rate of the organoaluminum compound.

Accordingly, in order to start the reaction under a stable condition, it is quite important to newly propose a simple and easy method which facilitates to check up that the feed quantity of organoaluminum compound amounts to the above-described proper quantity.

The present inventors have found out that the difference ($\delta T$) between the indications of a short thermometer and a long thermometer inserted into a reaction system on about the same horizontal level are largely varied in the step of the feeding of organoaluminum compound and that the electrostatic conditions in the reaction system are also varied. They have noticed also that the above phenomena relate to the stable continuous polymerization after that. Therefore, by giving consideration to these changes, it has been found out that an optimum feed quantity of organoaluminum compound can be determined by the following method of detection.

The aforementioned $\delta T$ occurs due to the adhesion of seed polymer particles to the inside wall of a reactor. The longer thermometer is deeply inserted into the reactor and it measures directly the temperatures of gas current and particulate materials. Accordingly, there is no obstacle for the measurement to a detecting portion except the collision with flowing polymer particles. Meanwhile, in the case of a shorter thermometer, the seed polymer particles which adhere to the inside wall of reactor are liable to deposit also on the detecting portion of the thermometer because the detecting portion is installed near the inside wall of the reactor. The adhered seed polymer particles act as a heat insulating material concerning the thermometer. As a result, a difference in temperatures occurs between the longer and shorter thermometers. In the meantime, the value of $\delta T$ is very small, i.e. about 0.5° to 1.0° C. when the seed polymer particles hardly adhere to the inside wall of a reactor. In other words, it is considered that the heat insulating effect is not produced in the regular polymerization period because the polymer particles hardly adhere to the inside wall of a reactor and the value of $\delta T$ is small.

Furthermore, the state of static electricity is naturally related to the adhesion of polymer particles and catalyst component to the inside wall of a reactor. The particles moving in the fluidized bed are electrically charged due to the collision with other particles or with inside walls of a reactor. The charged particles are adhered to the inside wall of the reactor by Coulomb forces. Accordingly, the state of static electricity in the reactor reflects the adhered condition of polymer particles and catalyst component as they stand. The condition of the static electricity in a reactor can be measured by various methods according to several theories of measurement. One of them is to measure an electrostatic voltage (electrostatic potential) which has been conventionally adopted. Another one is to measure the electric current caused by the electric charge which current is transmitted from charged particles to an electrode when the particles are brought into contact with the electrode in the reactor. The electric current generally oscillates across the neutral point (zero value) between positive and negative sides, although its amplitude is varied. The oscillation herein referred to means short period ones expressed by the order of second. In this description, the electric current which is caused to occur by the transmitting of electric charge of charged particles to the electrode in the reactor is called an electrostatic current.

The electrostatic voltage in the regular state is about 0 to +2 kV. Its variation, if any, is very small. The amplitude of the electrostatic current is about $10^{-6}$ to $10^{-7}$ A.

When the organoaluminum compound is fed successively into a reactor which contains substantially no organoaluminum compound, it was observed that the $\delta T$, the electrostatic voltage and the electrostatic current vary as follows.

(1) The value of $\delta T$ is considerably large such as 3° to 10° C., however, it decreases abruptly at a certain occasion indicating the range of, for example, 0.5° to 1° C.

The decrease in the value of $\delta T$ indicates that the degree of adhering is decreased, so that it means that the catalyst or something else becomes hardly adhered to the inside wall of the reactor by the feeding of organoaluminum compound into the reactor.

(2) The electrostatic voltage is lowered first to the negative side, however, when the organoaluminum compound is fed successively, the electrostatic voltage is raised to indicate a positive value through the passage of the zero point.

When a catalyst or something else is in the state in which the adhesion to the inside wall of the reactor is liable to occur, the electrostatic voltage often becomes negative. Accordingly, when the electrostatic voltage is changed from a negative value to zero (neutral) by the continuous feeding of organoaluminum compound, it means that the catalyst or something else is hardly adhered to the inside wall of the reactor by the feeding of the organoaluminum compound into the reactor.

(3) The electrostatic current indicates first an amplitude (ca. $5 \times 10^{-7}$ A) which deviates to the negative side. When the supply is continued, the center of oscillation is changed substantially to zero and the amplitude becomes quite small. After that, an amplitude (ca. $3 \times 10^{-7}$ A) deviated to the positive side is indicated.

When the catalyst or something else is liable to adhere to the inside wall of the reactor, the amplitude of the electrostatic current is often large to some extent. Accordingly, when the center of oscillation of the electrostatic current is changed to zero (neutral) and the amplitude of minimum value is indicated by the continuous feeding of organoaluminum compound, it means that the catalyst or something else became hardly adhered to the inside wall of the reactor.

In view of the above phenomena, the inventors have found out that the formation of sheet-like polymer in the initial stage of polymerization can be reduced and the lowering of the bulk density of polymer can be avoided by feeding organoaluminum compound in the first place and starting the polymerization after that.

However, in view of the fact that impurities are gradually released into the reaction system with a delay of time, it is not appropriate to determine immediately the quantity of organoaluminum compound on the basis of the above-described standard time. Furthermore, in order to avoid the formation of sheet-like polymer, the lowering of bulk density, it is important that the effective organoaluminum compound in a somewhat excess quantity must exist in the reaction system.

In the present invention, therefore, the quantity of organoaluminum compound is determined according to the above standard in the step (II), and after that the additional quantity of organoaluminum compound is determined in the step (III) according to the other standard described later on.

Accordingly, the feed quantity of organoaluminum compound is determined by a two-step method in the present invention such that the feed quantity of organoaluminum compound is determined in view of any one of the foregoing phenomenon in the first place and then the additional feed quantity is determined according to a separate standard.

Although the feed quantity of organoaluminum compound is determined in two steps, as far as the feeding operation meets the standards, the organoaluminum compound can be fed continuously, successively, or intermittently by dividing the feed into two or more parts. The organoaluminum compound used herein for the feeding into a reactor is generally the same as the one which is used in the regular operation after the starting of reaction.

The point at which the organoaluminum compound is fed is not especially limited. The gases in the reaction system is passed through the fluidized bed and taken out from the upper part of the reactor. The stream of gases is then passed to a heat exchanger and then it is circulated into the lower part of the reactor. It is possible to feed the organoaluminum compound to any part of this circulation system. If the organoaluminum compound is fed into the part just before the fluidized bed, the fed compound is adsorbed by the seed polymer in the fluidized bed. After saturating the seed polymer with the organoaluminum compound, it is further supplied to other parts of the reaction system (including circulation lines). Although the treatment of seed polymer is important, the treatment of other parts of reaction system including circulation lines is also important. Furthermore, when the organoaluminum compound is adsorbed by the seed polymer first of all, there is a tendency that the seed polymer adsorbs the organoaluminum compound excessively. Accordingly, it is desirable that the organoaluminum compound is fed to the downstream of the fluidized bed, preferably in any part on the downstream of the fluidized bed, at the same time, which is on the upstream of a heat exchanger.

The quantity of organoaluminum compound fed in the former step is determined according to the value of the above-mentioned $\delta T$ or the change of measured values of electrostatic voltages or electrostatic currents. In the case that a seed polymer already exists in the reactor and the organoaluminum compound does not exist substantially in the reaction system, the $\delta T$ in the fluidized bed indicates a constant value, the electrostatic voltage indicates a slightly negative value and the center of oscillation of the electric current which indicates a certain amplitude is slightly negative. However, when the organoaluminum compound is fed, some one of the following phenomena is observed: (1) the $\delta T$ indicates an abrupt decrease at a certain time point, (2) the electrostatic voltage rises from the negative to the positive and (3) the center of oscillation of the electrostatic current becomes zero and the amplitude becomes extremely small.

The feeding of organoaluminum compound must be continued until any one of the above phenomena is observed. That is, the time when (a) the $\delta T$ indicates an abrupt decrease, (b) the electrostatic voltage is changed from the negative to the positive, i.e. when it is passed through zero, and (c) the center of oscillation of the electrostatic current is zero and, at the same time, the amplitude indicates a minimum value. Any one of these standards can be employed in accordance with the detected phenomenon observed in a relevant vapor phase reaction.

In the above description, (a) the time when the $\delta T$ indicates an abrupt decrease can be obtained by the following method on the basis of the $\delta T$ value which is measured in accordance with the following description entitled as —Method for Measuring $\delta T$—.

(1) The changes of $\delta T$ are plotted on an axis of time to draw a curve;

(2) a tangential line is drawn at the point of maximum rate of decrease on the above curve; and (3) "the abruptly decreased point of $\delta T$" is indicated by the intersection point of the above tangential line and the axis of time.

The point of times of: (b) the electrostatic voltage changes from the negative to the positive at the value of zero and (c) the center of oscillation of the electrostatic current is zero and the amplitude indicates a minimum value can be determined according to the following —Method for Measuring Electrostatic Voltage— and —Method for Measuring Electrostatic Current—.

As described above, the occurrence of any one of the phenomena of: (a) the $\delta T$ passed the point of time of abrupt decrease, (b) the electrostatic voltage became zero or (c) the center of oscillation of electrostatic current is zero and the amplitude is at a minimum value, must be confirmed. After that, the feed quantity of organoaluminum compound can be determined by the following equation (I) using values of the volume of the whole reaction system including gas circulation pipings and the weight of seed polymer.

$$A = 0.044 \times V^{2/3} + aW \qquad (I)$$

wherein A is the quantity (mol) of the feed of organoaluminum compound, V is the volume ($m^3$) of the whole reaction system including gas circulation pipings, W is the weight (ton) of seed polymer; and "a" is a coefficient (mol/ton) in the range from 0 to 89.

The value of the above "a" is preferably in the range of 0.7 to 21, and more preferably 0.7 to 9.5. When the value of "a" is a negative value, the formation of sheet-like polymer is liable to occur and the bulk density and MFR value are lowered. On the other hand, when the value of "a" exceeds 89, the ratio of lower molecular weight polymer increases, which is not desirable.

The feed quantity of the organoaluminum compound can be determined by the above-described procedure and it is possible to feed a sufficient quantity of organoaluminum compound in order to avoid the formation of sheet-like polymer in the initial stage of polymerization.

The feed rate of organoaluminum compound is not especially limited as far as it is fed slowly to some extent while giving consideration to the diffusion and mixing of the organoaluminum compound in the reaction system. The feed rate is generally in the range of 0.01 to 50 mol/(hr·ton of seed polymer) and preferably in the range of 0.2 to 40 mol/(hr·ton of seed polymer). The feed rate can be varied within the above range, however, the feeding may be done at a constant rate. Like the feeding under regular operation conditions, the organoaluminum compound can be fed as a solution in a suitable inert hydrocarbon.

The time length of the feeding of organoaluminum compound is not limited. The feeding of the whole organoaluminum compound is generally completed in 10 minutes to 24 hours. After the feeding, the circulation of gas may be continued if desired.

After the necessary quantity of organoaluminum compound is fed, the polymerization is started according to the ordinary method. That is, when the organoaluminum compound is fed without the feeding of olefin, the polymerization is started with feeding a solid catalyst component and olefins. In the case that olefins are already fed, the polymerization is started by feeding a solid catalyst component. Incidentally, if necessary, the feed rate of organoaluminum compound is changed to a predetermined rate of feeding in a regular state operation.

The feeding of olefins into the reaction system is preferably carried out together with a suitable inert gas such as nitrogen. For the purpose to control molecular weight, hydrogen can be fed together.

The present invention will be described in more detail with reference to examples and comparative examples. It should be noted, however, that the present invention is by no means restricted to these examples and comparative examples.

EXAMPLE

Preparation Example for Solid Catalyst Components

A 500 ml three-necked flask equipped with a stirrer and a reflux condenser was fed with 50 g of $SiO_2$ which was baked at 600° C., 160 ml of dehydrated hexane and 2.2 ml of titanium tetrachloride. The contents were allowed to react for 3 hours under the refluxing with hexane. After the reaction, the reaction mixture was cooled and 30 ml of diethylaluminum chloride solution in hexane (1 mmol/ml) was added. Reaction was further carried out for 2 hours under the refluxing with hexane and the reaction mixture was dried under reduced pressure at 120° C. to remove the hexane. The thus obtained reaction product is hereinafter referred to as "Component I".

A stainless steel pot of 400 ml in internal volume containing 25 stainless steel balls of 0.5 inch in diameter, was fed with 10 g of commercially available anhydrous magnesium chloride and 4.2 g of aluminum triethoxide. Ball milling was carried out at room temperature for 16 hours in an atmosphere of nitrogen. The thus obtained reaction product is hereinafter referred to as "Component II".

The above Component II (5.4 g) was dissolved into 160 ml of anhydrous ethanol and the whole solution was fed into a three-necked flask containing Component I. Reaction was carried out for 3 hours under the refluxing of ethanol. After that, drying under reduced pressure was then carried out at 150° C. for 6 hours to obtain a solid catalyst component. The content of titanium was 15 mg per 1 g of the obtained solid catalyst component.

The reaction for the preparation of the solid catalyst component was performed in an inert gas atmosphere to avoid contamination with moisture.

Method for Measuring δT

As a thermometer, any one of thermoelectric thermometers, resistance thermometers and mechanical thermometers can be used. The thermoelectric thermometer is conveniently used in general.

In a longer thermometer, the measuring section must be separated leaving a sufficient distance apart from the inside wall of a reactor because it measures the temperatures of the current of gases and the flow of particles in the middle portion of the reactor. However, there is no other limitation. The polymerization of olefins is an exothermic reaction, in which the temperature gradient to the reactor's diameter direction near the inside wall of reactor is large but that of the central portion is comparatively small. Accordingly, in order to measure the temperature in the central part, it is only necessary that the measuring section of thermometer may be sufficiently separated from the inside wall of the reactor. In an ordinary reactor, it is sufficient that the measuring section of thermometer is separated from the inside wall of the reactor by 100 mm or more.

Meanwhile, the shorter thermometer is used not for measuring the temperature of reactor wall but for measuring the temperatures of gases and particles which are in contact with the inside wall of the reactor. It is, therefore, desirable that the measuring section of the shorter thermometer is place as close as possible to the inside wall of reactor. The measuring section is generally placed within the distance of less than 100 mm, preferably less than 50 mm from the inside wall of reactor. If the measuring section is too close to the inside wall, it is influenced by the temperature of the reactor wall or by the ambient atmosphere. In such a case, the conduction of heat can be cut off by a suitable heat insulating material such as magnesium oxide.

The above two kinds of thermometers are installed preferably in the portion in which the formation of sheet-like polymer is liable to occur. In general cases, they are installed on the upper side near the gas distributor plate of a fluidized bed reactor. This position may be determined in view of previous experiment and experience. The two kinds of thermometers are installed approximately on the same horizontal level. In the case of a reactor having a circular cross-section, both the thermometers are installed in a face-to-face relationship on the same level.

In the fluidized bed reactor (cylindrical, 250 mm in inner diameter) used in the examples of the present invention, the position of the measuring section of a longer thermometer was 500 mm above the gas distributor plate and 110 mm distance apart from the inside wall of the reactor and the position of the measuring-section of a shorter thermometer was 700 mm above the gas distributor plate and 25 mm distance apart from the inside wall.

Method for Measuring Electrostatic Voltage

The electrostatic voltmeter used for measuring the electrostatic voltage in the present invention is not limited as far as it can measure the electrostatic voltage of fluidized particles. For example, the electrostatic voltmeter having a stainless steel disk-like or rod-like electrode can be used. It is suitable that the measuring section is set at a point where the formation of sheet-like polymer is liable to occur. In general cases, they are installed on the upper side near the gas distributor plate of a fluidized bed reactor. This position may be determined in view of previous experiments and experiences.

In the fluidized bed reactor (cylindrical, 250 mm in inner diameter) used in examples of the present invention, a disk-like electrode made of stainless steel was installed 300 mm above the gas distributor plate and an electrostatic voltmeter was connected to the electrode to measure the electrostatic voltage in the reactor.

Method for Measuring Electrostatic Current

The method for measuring the electrostatic current in the present invention is not limited as far as it can measure the minute electrostatic current which is generated by the transfer of electric charge from fluidized charged particles to the electrode. In other words, when charged flowing particles are brought into contact with an electrode, the electric charges on the particles are transferred to the electrode, a current due to which charge is measured. In an exemplary measuring device, a metal electrode such as one made of stainless steel is fixed to the extreme end of a probe and the electrode is electrically insulated from the probe and reactor body, while the probe body is grounded through the reactor body (made of a metal). The electrostatic current is measured by connecting a suitable commercially available ammeter.

When the above probe is inserted into a fluidized bed, particles moving in the fluidized bed collide with the tip end of the electrode. An electrostatic current is thus produced between the particles and electrode. Accordingly, the measured electrostatic current is the one which flows between the electrode installed at the tip end of the probe and the earth ground.

The electrostatic current measured by the above method generally oscillates and fluctuates and its positive and negative polarity as well as its absolute value are varied. The amplitude and the center of oscillation of the current is obtained by using a suitable recording apparatus.

It is appropriate that the above probe is installed at a point where the sheet-like polymer is liable to be formed in the reactor. In general cases, it is installed on the upper side near the gas distributor plate of a fluidized bed reactor. This position may be determined in view of previous experiments and experiences.

In the fluidized bed reactor (cylindrical, 250 mm in inner diameter) used in examples of the present invention, a disk-like electrode made of stainless steel was installed 300 mm above the gas distributor plate and an ammeter was connected to the electrode to measure the electrostatic current in the reactor. In addition, the measured oscillating values are continuously recorded on a recording paper and the amplitude and the center of oscillation was obtained, thereby determining the time point at which the center of oscillation is zero and the amplitude is minimum.

Method to Start the Operation

By using a fluidized bed reactor of 250 mm in diameter and 825 lit. in volume including gas circulation pipings, the copolymerization of ethylene and butene-1 was carried out. The operation before the start of reaction was as follows:

(1) Primary drying was carried out for 1 day by feeding nitrogen of 95° C., 0.5 MPa·G and a flow rate of 10 Nm$^3$/hr into a reaction system.

(2) 16 kg of seed polymer was fed into the reactor.

(3) The pressure in the reactor was raised from 0 to 0.5 MPa·G and the pressure was then released. This operation was repeated three times in order to remove oxygen.

(4) After feeding the initial quantity of triethylaluminum (TEA) indicated in the following Table 1 and the following standards described in the Examples and Comparative Examples, the solid catalyst component containing Ti and Mg prepared in the foregoing Preparation Example for Solid Catalyst Components was continuously fed at a rate of 1.0 g/hr and a weight ratio of TEA to the solid catalyst component of 0.5. The temperature of reactant gas was 85° C., the molar ratio of hydrogen/ethylene was 0.1 and the molar ratio of butene-1/ethylene was 0.4. The pressure of reaction was 1.96 MPa·G.

Incidentally, all the Examples and Comparative Examples disclosed herein were carried out independently. The respective experiments were done with proper intervals of several days to several weeks. More particularly, the polymerization apparatus after each experiment was opened and cleaned, and after that, the next experiment was started. The solid catalyst component was separately prepared before each experiment.

Examples 1 to 3

The value of δT was obtained by using a longer thermometer installed at 500 mm above the gas distributor plate and 110 mm distance apart from the inside wall and a shorter thermometer installed at 700 mm above the gas distributor plate and 25 mm distance apart from the inside wall of the reactor.

With measuring the temperature in the reactor, TEA was fed at a rate of 2.75 mol/(hr·ton of seed polymer) until the δT was abruptly decreased. The quantity of additional TEA to be fed further was calculated by using the equation (I) with the value "a" indicated in Table 1.

After that, the reaction was started by continuously feeding the solid catalyst component and TEA. The results are shown in the following Table 1.

Comparative Example 1

The experiment was carried out in the like manner as in the above Examples except that the continuous feeding of the solid catalyst component and TEA in the above-mentioned feeding rates, respectively. were begun before the abrupt decreasing of δT. The results are also shown in Table 1.

TABLE 1

| Example | Value "a" in Equation (I) (mol/ton) | Sheet-like Polymer | Bulk Density (g/cc) | MFR (g/10 min) | Catalytic Activity(*) |
| --- | --- | --- | --- | --- | --- |
| Example 1 | 2.8 | Not formed | 0.40 | Normal | 1.0 |
| Example 2 | 11 | Not formed | 0.40 | Normal | 0.8 |
| Example 3 | 30 | Not formed | 0.40 | Normal | 0.5 |
| Comp. Exam. 1(**) | — | Formed after 12 hrs | 0.30 | Lowered | 1.5 |

(*): Indicated with relative values on the basis that the case in which Value a is in the optimum range is regarded as 1.0. (This is applied hereinafter)
(**): The feed of catalyst was started before the δT is abruptly decreased.

Examples 4 to 6

With measuring the electrostatic voltage in the reactor, TEA was fed at a rate of 2.75 mol/(hr·ton of seed polymer) until the value was changed to zero. Additional TEA indicated in Table 2 was further fed.

After that, the reaction was started by continuously feeding the solid catalyst component and TEA. The results are shown in the following Table 2.

Comparative Example 2

The experiment was carried out in the like manner as in the above Examples 4 to 6 except that the continuous feeding of the solid catalyst component and TEA was begun at a time when the value of electrostatic voltage is a negative. The results are also shown in Table 2.

TABLE 2

| Example | Value "a" in Equation (I) (mol/ton) | Sheet-like Polymer | Bulk Density (g/cc) | MFR (g/10 min) | Catalytic Activity(*) |
| --- | --- | --- | --- | --- | --- |
| Example 4 | 2.8 | Not formed | 0.39 | Normal | 1.0 |
| Example 5 | 11 | Not formed | 0.41 | Normal | 0.8 |
| Example 6 | 30 | Not formed | 0.40 | Slightly increased | 0.4 |
| Comp. Exam. 2(*) | — | Formed after 10 hrs | 0.32 | Lowered | 1.7 |

(*): The feeding of catalyst was started at a time when the electrostatic voltage is negative.

Examples 7 to 9

With measuring the electrostatic current in the reactor, TEA was fed at a rate of 2.75 mol/(hr·ton of seed polymer) until the center of its oscillation was changed to zero and the amplitude became minimum. Additional TEA indicated in Table 3 was further fed.

After that, the reaction was started by continuously feeding the solid catalyst component and TEA. The results are shown in the following Table 3.

Comparative Example 3

The experiment was carried out in the like manner as in the above Examples 7 to 9 except that the continuous feeding of the solid catalyst component and TEA was begun before the time when the value of electrostatic current changed to zero and the amplitude of the current became minimum. The results are also shown in Table 3.

TABLE 3

| Example | Value "a" in Equation (I) (mol/ton) | Sheet-like Polymer | Bulk Density (g/cc) | MFR (g/10 min) | Catalytic Activity(*) |
|---|---|---|---|---|---|
| Example 7 | 2.8 | Not formed | 0.39 | Normal | 1.0 |
| Example 8 | 12 | Not formed | 0.39 | Normal | 0.7 |
| Example 9 | 32 | Not formed | 0.39 | Slightly increased | 0.35 |
| Comp. Exam. 3(*) | — | Formed after 23 hrs | 0.31 | Lowered | 1.6 |

(*): The feeding of catalyst was started at the time when the center of oscillating electrostatic current changed to zero and the amplitude of the current became minimum value.

What is claimed is:

1. In a method for starting vapor phase polymerization of olefins by feeding a catalyst comprising an organoaluminum compound and a solid catalyst component containing at least one or both of titanium and vanadium, and magnesium into a reactor;

the improvement comprising the steps of:
   (I) feeding seed polymer particles into said reactor;
   (II) then feeding an organoaluminum compound into said reactor with at least one measuring step selected from the group consisting of:
      (a) measuring the difference ($\delta T$) between the temperature indicated by a short thermometer inserted into said reactor and the temperature indicated by a long thermometer inserted into said reactor, and when the difference in temperatures ($\delta T$) abruptly decreases provisionally ceasing the feeding of said organoaluminum compound,
      (b) measuring the electrostatic voltage in the reactor and when said voltage is changed from a minus value to zero, provisionally ceasing the feeding of said organoaluminum compound, and
      (c) measuring the center of oscillation of electrostatic current and its amplitude in the reactor and when the oscillation is changed to zero and the amplitude reaches a minimum, provisionally ceasing the feeding of said organoaluminum compound;
   (III) then feeding an additional quantity of organoaluminum compound into said reactor in the quantity calculated according to the following equation:

$$A = 0.044 \times V^{2/3} + aW$$

wherein A is the quantity (mol) of the feed of organoaluminum compound, V is the volume (m³) of the whole reaction system including gas circulation pipings, W is the weight (ton) of said seed polymer, and "a" is a coefficient (mol/ton) in the range from 0 to 89; and
   (IV) then starting the polymerization reaction with further feeding of a solid catalyst component and an organoaluminum compound.

2. The method of vapor phase polymerization of olefins as claimed in claim 1, wherein said organoaluminum compound is an alkylaluminum.

3. The method of vapor phase polymerization of olefins as claimed in claim 1, wherein said catalyst comprises a solid catalyst component containing a tetra-valent titanium compound and a magnesium halide, and an alkylaluminum.

4. The method of vapor phase polymerization of olefins as claimed in claim 1, wherein each of said olefins has 2 to 8 carbon atoms.

5. A method as claimed in claim 1 wherein the temperature measured by said short thermometer is measured less than 50 mm from the inner wall of the reactor and the temperature measured by said long thermometer is measured at least 100 mm from said inner wall.

6. A method as claimed in claim 5 wherein said temperatures are measured above the gas distribution plate of a fluidized bed reactor.

7. A method as claimed in claim 1 wherein the feeding of the organoaluminum compound in steps II and III is without feeding of olefin and the polymerization reactor is started with the feeding of olefin in step IV.

8. A method for starting the vapor phase polymerization of one or more olefins to reduce the formation of sheet-like polymer on the reactor walls, the polymerization being catalyzed by a catalyst comprising an organoaluminum compound and a solid catalyst component containing at least one or both of titanium and vanadium, and magnesium, said method comprising:

(a) feeding seed polymer particles into a reactor;
   (b) then feeding an organoaluminum compound into the reactor;
   (c) monitoring the adherence of seed polymer particles on the inside wall of the reactor while feeding the organoaluminum compound into the reactor, the feeding of the organoaluminum compound being conducted until said monitoring indicates a decrease in the adherence of seed polymer particles to the inside wall of the reactor;
   (d) then feeding a second quantity of organoaluminum compound into the reactor, said second quantity being calculated according to the equation:

$$A = 0.044 \times V^{2/3} + aW$$

wherein A is the quantity of the feed of organoaluminum compound, V is the volume of the whole reaction system including gas circulation pipings, W is the weight of said seed polymer, and "a" is a coefficient in the range from 0 to 89; and
   (e) then starting the polymerization reaction with feeding of a solid catalyst component and an organoaluminum compound.

9. A method as claimed in claim 8 wherein said monitoring comprises measuring the difference ($\delta T$) between: (a) the temperature of gases and flowing polymer particles in a section of the reactor separated from the inner wall of the reactor, and (b) the temperature of gases and adhered polymer particles which are in contact with the inside wall of the reactor, the feeding of said organoaluminum compound in step (c) being provisionally ceased when said difference in temperature ($\delta T$) abruptly decreases.

10. A method as claimed in claim 8 wherein said monitoring comprises measuring the electrostatic voltage in the reactor, and the feeding of said organoaluminum compound in step (c) is provisionally ceased when said voltage changes from a minus value to zero.

11. A method as claimed in claim 8 wherein said monitoring comprises measuring the center of oscillation of electrostatic current and its amplitude in the reactor, and the feeding of said organoaluminum compound in step (c) is provisionally ceased when said oscillation changes to zero and the amplitude reaches a minimum.

12. A method as claimed in claim 9 wherein said temperatures (a) and (b) are measured at least 100 mm from the inner wall and less than 50 mm from the inner wall, respectively.

13. A method as claimed in claim 12 wherein said temperatures are measured above the gas distribution plate of a fluidized bed reactor.

14. A method as claimed in claim 8 wherein said organoaluminum compound is an alkylaluminum.

15. A method as claimed in claim 8 wherein said catalyst comprises a solid catalyst component containing a tetravalent titanium compound and a magnesium halide, and an alkylaluminum.

16. A method as claimed in claim 8 wherein each of said olefins has 2 to 8 carbon atoms.

* * * * *